G. JAHANSAN.
PARING MACHINE.
APPLICATION FILED OCT. 29, 1908.
943,249.
Patented Dec. 14, 1909.
2 SHEETS—SHEET 2.
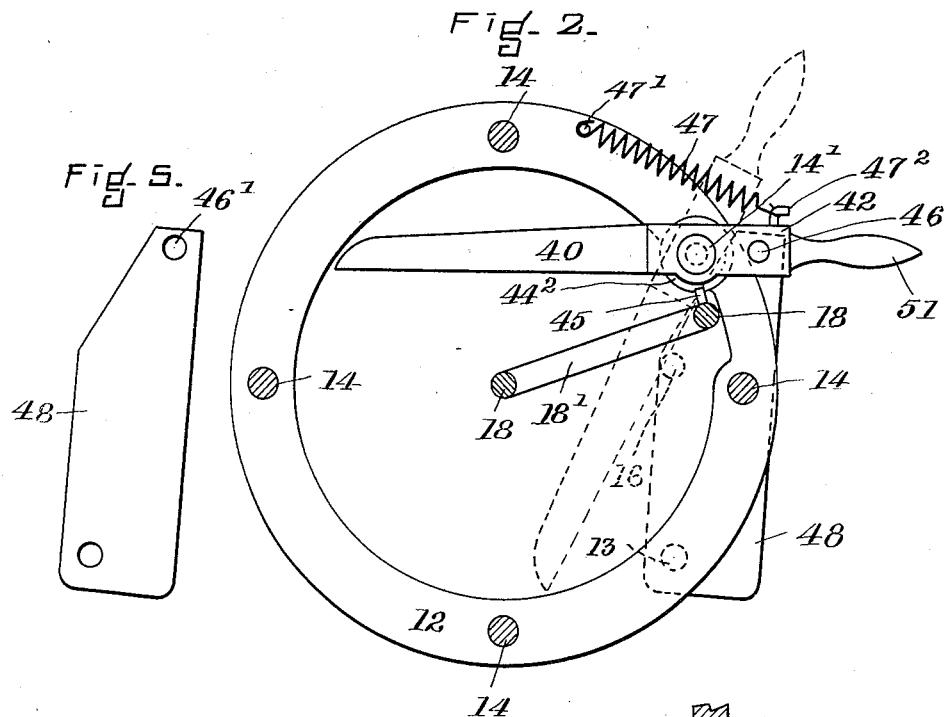
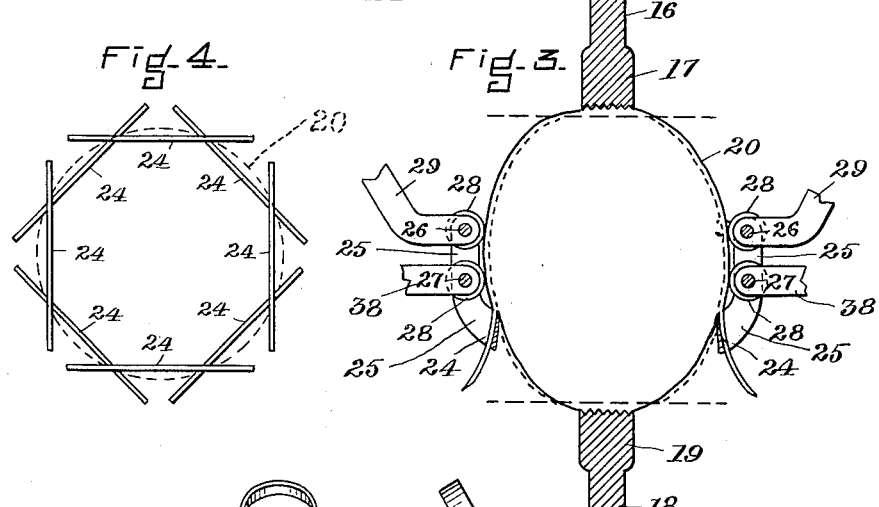
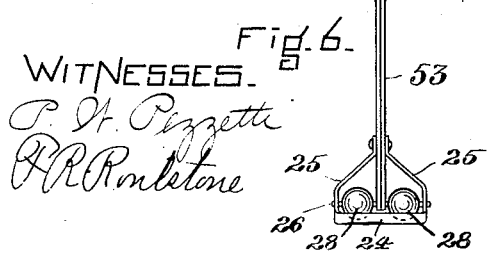
WITNESSES.
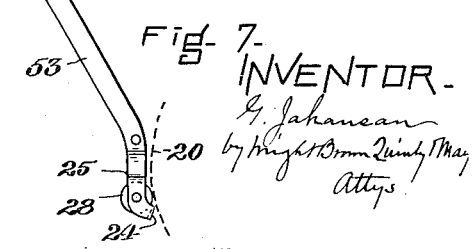
INVENTOR.

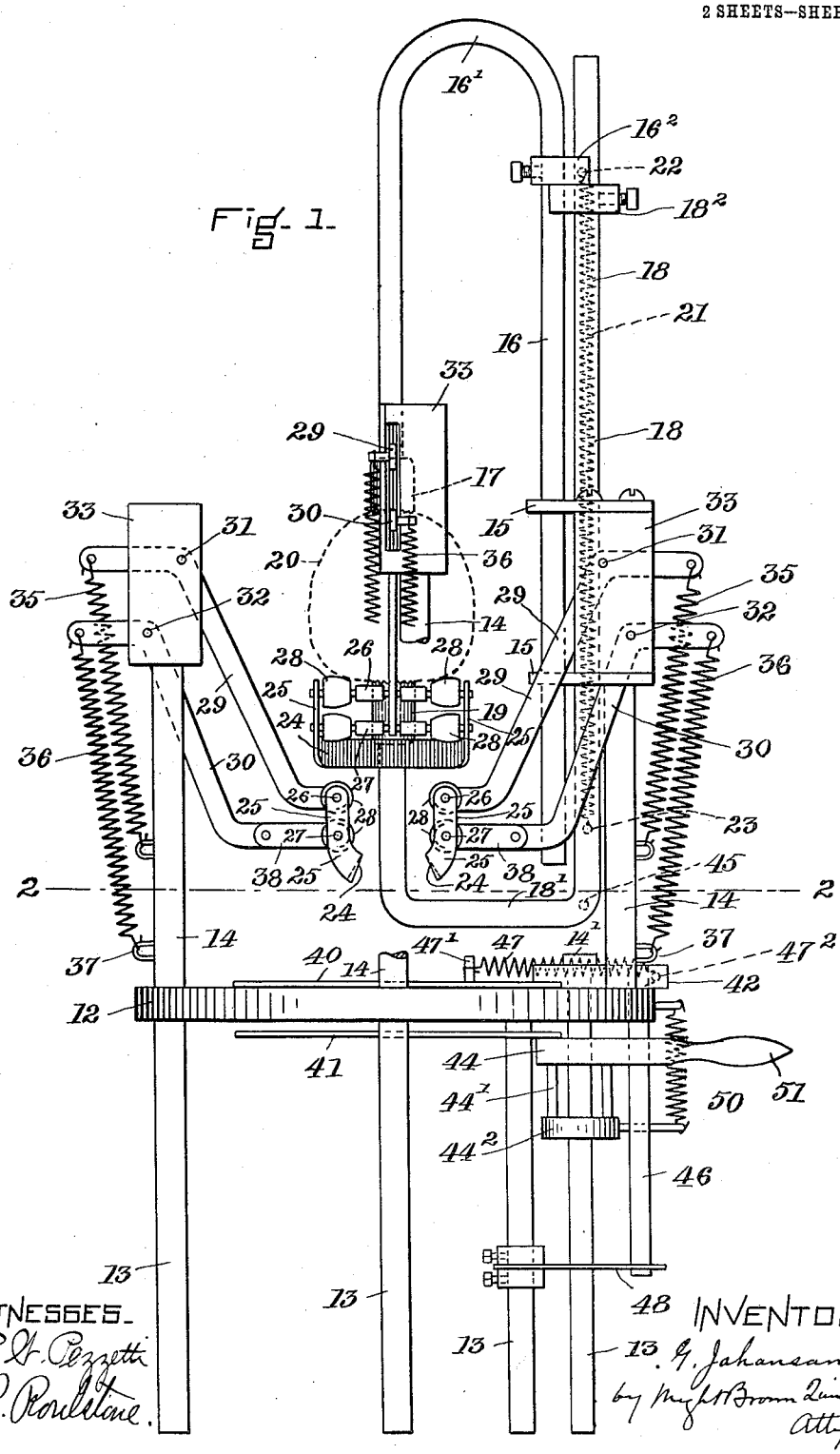

UNITED STATES PATENT OFFICE.

GUSTAF JAHANSAN, OF CRANSTON, RHODE ISLAND, ASSIGNOR OF ONE-THIRD TO LUCIUS F. ARNOLD AND ONE-THIRD TO GEORGE L. TITUS, BOTH OF PROVIDENCE, RHODE ISLAND.

PARING-MACHINE.

943,249.   Specification of Letters Patent.   Patented Dec. 14, 1909.

Application filed October 29, 1908. Serial No. 459,983.

*To all whom it may concern:*

Be it known that I, GUSTAF JAHANSAN, of Cranston, in the county of Providence and State of Rhode Island, have invented certain new and useful Improvements in Paring-Machines, of which the following is a specification.

This invention relates to machines for paring potatoes and other vegetables of like general form, and is embodied in a machine which includes a pair of alined jaws adapted to grasp the ends of a potato, and removable in a predetermined path with the potato with which they are engaged, and a plurality of paring blades arranged to substantially surround the path of the jaws, and pressed yieldingly inward toward said path so that they are adapted to yieldingly engage the potato moved by the jaws, means being provided for conforming the blades to the varying inclinations of the surface of the potato, and the entire arrangement being such that a movement of the potato through said path will cause the jaws to remove substantially all parts of the skin of the potato excepting the parts directly in contact with the jaws, a pair of end paring blades being provided which are movable crosswise of the path of the jaws and are adapted to remove the end portions of the skin of the potato which are covered by the jaws.

The invention consists in the improved machine which I will now proceed to describe and claim.

Of the accompanying drawings, forming a part of this specification,—Figure 1 represents a side elevation of a potato paring machine embodying my invention. Fig. 2 represents a section on line 2—2 of Fig. 1. Fig. 3 represents a fragmentary sectional view illustrating the operation of paring a potato. Fig. 4 represents a diagrammatic view showing the preferred arrangement of the paring blades. Fig. 5 represents a plan view of the spring detent plate hereinafter referred to. Figs. 6 and 7 represent a front and an edge view of a hand operated paring member.

The same reference characters indicate the same parts in all the figures.

The supporting frame of the machine, as here shown, includes a frame member 12, preferably of annular form mounted on supporting legs 13.

14 represents a fixed standard rising from one side of the frame member 12 and provided with fixed guides 15 of any suitable construction in which vertical shanks 16 and 18 are movable, said standard being one of a series of standards, each of which has another function hereinafter described. The shank 16 is bent at 16' and extends downwardly from the said bent portion, its lower end being provided with a jaw 17. The shank 18 is bent at 18' and extends upwardly from the bent portion, and is provided with a jaw 19 which is located in alinement with the jaw 17. Said jaws are in alinement with each other and are adapted to grasp a potato 20 or other vegetable of like form. The shanks 16 and 18 are movable independently of each other in the guides 15, and are connected by a spring 21 which is attached at one end to an arm or projection 22 on the shank 16, and at the other end to an arm or projection 23 on the shank 18, said spring acting to move the jaws 17 and 19 toward each other and hold them yieldingly closed upon a potato inserted between them.

The jaws are movable in unison in a predetermined vertical path governed by the guides 15. The upward movement of the lower jaw 19 is limited so that it cannot rise above a predetermined point which is just above the upper pair of paring blades, hereinafter described. The upper jaw 17 is enabled by the spring 21 to move upwardly above the jaw 19 to any distance required by the size of the potato inserted between the jaws. The jaw shanks and the guides in which they move are formed to prevent the jaws from swinging out of their predetermined path, between the paring blades hereinafter described. The shank 16 is provided with a projection $16^2$ against which a similar projection $18^2$ on the shank 18 is normally held by the spring 21.

The machine is provided with a plurality of paring blades 24 which are so arranged that they collectively surround the path in which the jaws and the potato grasped thereby are movable, there being a sufficient number of blades 24 to act on practically all the parts of the surface of the potato, the blades extending in different horizontal directions so that they collectively surround the space through which the potato is passed by the downward movement of the jaws. Means are provided for yieldingly pressing each blade inwardly toward the path of the jaws, and for automatically governing the inclination of each blade by the inclination of the portion of the potato on which it acts. In the construction here shown, means are provided as follows:—Each blade 24 has at its ends upwardly projecting arms 25, 25 which are connected by horizontal rods 26, 27. On said rods are loosely mounted antifriction rolls 28 adapted to bear upon the surface of the potato, each rod having two rolls, which are separated by a space into which a portion of the convex surface of the potato projects. Each blade is yieldingly supported by two levers 29 and 30 which are pivoted respectively at 31 and 32 to a head 33 mounted on one of the fixed standards 14. Each of said levers 29 and 30 has a shorter arm projecting outwardly from the head 33, said shorter arms being connected by springs 35 and 36 with fixed members 37, said springs acting to swing the levers 29, 30 inwardly toward the path of the jaws. The lever 29 is jointed loosely to the upper rod 26 and the lever 30 is connected by a link 38 with the lower rod 27.

It will be seen that the above described construction provides not only for a yielding pressure of the paring blades against the potato, but also for a variation of their inclination, the inclination of the blades being governed by the surface of the potato, as indicated clearly in Fig. 3, where the rolls 28 are shown as bearing against the surface of the potato above the paring blades 24. The paring blades are preferably arranged in pairs, each supported as above described, one blade of each pair being directly opposite the other blade of the same pair, and the pairs of blades being mounted at different heights and at different angles so that the blades collectively surround the potato without interfering with each other.

In the operation of the machine, the jaws 17 and 19 are raised until the lower jaw 19 is above the upper pair of blades 24. The potato is then inserted between the jaws and downward pressure is exerted on the shank of the upper jaw, this pressure being communicated to the potato, and through the latter to the lower jaw, so that the jaws and the potato are moved downwardly through the space surrounded by the paring blades. During this movement each paring blade removes a portion of the skin of the potato, the several blades removing longitudinal strips of skin, and denuding the same from end to end, thus removing practically all parts of the skin excepting those with which the jaws 17 and 19 are in contact.

40, 41 represent two end paring blades which are adapted to oscillate in planes at right angles with the path of the jaws 17 and 19. The upper blade 40 is attached to a head 42 which is adapted to oscillate on a fixed stud 14' in a predetermined horizontal path, and is confined against vertical movement on said stud. The arrangement of the blade 40 is such that it moves across the path of the jaws just below the upper jaw 17 when the latter is at the lower extreme of its movement, said blade being adapted to sever the portion of the skin of the potato on which the upper jaw 17 bears. The lower blade 41 is adapted not only to oscillate with the blade 40, but to move vertically on one of the supporting legs 13, said blade being affixed to a head 44 to which is attached by rods 44' a sliding collar $44^2$ located in the path of a stud or projection 45 on the shank 18 which supports the lower jaw, the arrangement being such that when the jaws are moved downwardly, the projection 45 strikes the collar $44^2$ and depresses the latter with the head 44 and blade 41, so that when the lower jaw is at the lower extreme of its movement, the path of the blade 41 will be just above it, and the blade in moving across the path of the jaws, will remove from the lower end of the potato the portion of the skin on which the lower jaw bears.

The heads 42 and 44 supporting the end paring blades 40 and 41, are connected to cause said blades to swing in unison by means of a rod 46 affixed to the head 42 and adapted to slide in an orifice in the head 44. The end paring blades 40 and 41 are actuated by means of a spring 47 which is connected at one end at 47' with a fixed part of the supporting frame, and at the other end at $47^2$ with the head 42, said spring acting to swing the blades 40 and 41 across the path of the jaws to the position shown by dotted lines in Fig. 2. Means are provided for locking the blades 40 and 41 in a retracted position at one side of the path of the jaws against the stress of the spring 47, said means as here shown including the rod or pin 46 and a spring detent composed of a resilient plate 48 attached at one end to one of the legs 13 and having an orifice 46' adapted to receive the lower end of the pin 46. The free end of the spring plate 48 is located in the path of the shank 16 supporting the upper jaw, so that when the jaws descend, said shank will strike the plate 48 and press the latter downwardly far enough to release it from the pin 46, thus allowing the spring 47 to swing the end paring blades 40 and 41 across the path of the jaws, this action taking place at the end of the downward movement of the jaws and the potato. The head 44 carrying the lower end paring blade 41 is yieldingly held in a raised position by a spring 50.

From the foregoing, it will be seen that at the end of the downward movement of the jaws, the end paring blades are released from their retracted position and are forced by the spring 47 across the path of the jaws, and are caused to slice off the skin from the ends of the potato with which the jaws are engaged, the upper blade 40 moving in a path of predetermined height while the lower blade moves in a path the height of which is governed by the position of the lower jaw 19, and therefore by the length of the potato.

51 represents a handle attached to the head 44 for convenience in swinging the blades 40 and 41 to their retracted position.

To avoid unnecessary multiplication of parts, I have shown in Fig. 1 what will be understood as two pairs of paring blades 24, the blades of one pair being at right angles with the blades of the other pair. In practice, however, I prefer to provide four pairs of blades 24, relatively arranged, as shown in Fig. 4, when viewed from above, and all engaged with a potato, the latter being shown by dotted lines in said figure.

In Fig. 3 I show a sectional view of the jaws and of one pair of blades 24 engaged with a potato, the curved dotted lines below the blades indicating the outer surface of the paring already removed, while the curved dotted lines above the blades indicate the line along which the blades are to cut in completing their work. The horizontal dotted lines near the upper and lower ends of the potato indicate the paths of the end paring blades 40 and 41, when the upper jaw 17 has reached the lower extreme of its movement.

My invention is not limited to the details of construction here shown, and the same may be variously modified without departing from the spirit of the invention.

Each of the blades 24 and the parts which support it constitute a potato paring member, the essential features of which are a blade, a carrier for the blade, and a rest mounted on the carrier and adapted to bear on a potato and govern the angle of the blade relatively to the potato. In the embodiment of the invention here shown, the arms 25 at the ends of the blade, the levers 29 and 30 and the rods 26 and 27 constitute the carrier, the rolls 28 constituting collectively an anti-frictional rest mounted on the carrier. It is obvious that the details of construction of the carrier and rest may be variously modified, so long as they are relatively arranged to secure the described result.

In Figs. 6 and 7 I have shown a modified construction of a paring member in which the arms 25 are attached to a shank 53 which constitutes a part of the carrier. A single rod 26 is employed to support two anti-friction rolls 28 constituting the rest. The paring member thus constituted is adapted to be used by hand. The two antifriction rolls 28 are separated from each other by a space into which a portion of the crowning surface of a potato projects during the paring operation. The rolls are therefore prevented by the surface of the potato from moving endwise or in the direction of the length of the cutting edge of the knife, so that the knife is prevented by the potato and the rolls from moving endwise out of its proper operative relation to the potato.

It is obvious that the described machine may be used for paring any vegetable or fruit which is capable of being treated in the manner described.

I claim:

1. A paring machine comprising a pair of clamping jaws movable in a predetermined path, means for yieldingly pressing said jaws against a body placed between them, and a plurality of pivoted paring blades arranged to substantially surround said path, and adapted to assume different angles relatively to the said path, means for yieldingly pressing said blades inwardly toward the path of the jaws, and means for conforming the blades to the varying inclinations of the surface of a body engaged by the jaws.

2. A paring machine comprising a pair of clamping jaws adapted to engage a body to be pared, and movable in a predetermined path, and a plurality of paring blades, arranged to substantially surround the said path, means for yieldingly pressing said blades inwardly toward the path of the jaws, means for conforming the blades to the varying inclinations of the surface of a body engaged by the jaws, and a pair of end paring blades movable crosswise of said path and adapted to remove the end portions of the body.

3. A paring machine comprising means for grasping a body to be pared at opposite parts of the surface and moving it in a predetermined path, and a plurality of paring blades arranged to substantially surround the body, each blade having arms at its ends, rods mounted in said arms and rolls journaled on said arms and adapted to bear on the surface of the body, the blade being yieldingly supported by a pair of spring-pressed pivoted levers connected with said rods.

4. A paring machine comprising a pair of clamping jaws adapted to engage a body to be pared and movable in a predetermined path, means for yieldingly pressing the jaws toward each other, means for paring a body held and moved by the jaws, and paring blades adapted to oscillate in unison across the path of the body, one of said blades being movable in a predetermined path, and the other in a path which is governed by the size of the body interposed between the jaws.

5. A paring machine comprising a pair of clamping jaws adapted to engage a body to be pared and movable in a predetermined path, means for yieldingly pressing the jaws toward each other, means for paring a body held and moved by the jaws, an upper end-paring blade mounted on an oscillatory head which is movable in a predetermined path, and a lower end paring blade mounted on an oscillatory head which is vertically movable with the lower clamping jaw.

6. A paring machine comprising a pair of clamping jaws adapted to engage a body to be pared, and movable in a predetermined path, and a plurality of paring blades arranged to substantially surround the said path, means for yieldingly pressing said blades inwardly toward the path of the jaws, means for conforming the blades to the varying inclinations of the surface of a body engaged by the jaws, a pair of end paring blades movable crosswise of said path and adapted to remove the end portions of the body, means for locking said end paring blades in a retracted position, and means for releasing the blades when the clamping jaws descend, a spring being provided for moving the end-paring blades across the path of the body.

7. A paring device comprising a blade, a carrier therefor, and rolls rotatably mounted on the carrier and adapted to bear on the body being pared, and govern the angle of the blade, said rolls being rotatable on an axis substantially parallel with the cutting edge of the blade, and separated by a space adapted to receive a portion of the surface of the body, whereby endwise displacement of the blade relatively to the body is prevented.

In testimony whereof I have affixed my signature, in presence of two witnesses.

GUSTAF JAHANSAN.

Witnesses:
LUCIUS F. ARNOLD,
JOHN C. DAVIS.